(12) United States Patent
Chen et al.

(10) Patent No.: US 10,324,970 B2
(45) Date of Patent: Jun. 18, 2019

(54) FEEDBACK ANALYSIS FOR CONTENT IMPROVEMENT TASKS

(71) Applicant: International Business Machines Corporation, Armonk, NY (US)

(72) Inventors: Feng-wei Chen, Cary, NC (US); Joseph D. Johnson, Raleigh, NC (US); Yongcheng Li, Cary, NC (US); Samuel R. McHan, Jr., Apex, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 155 days.

(21) Appl. No.: 13/758,273

(22) Filed: Feb. 4, 2013

(65) Prior Publication Data

US 2014/0222816 A1   Aug. 7, 2014

(51) Int. Cl.
*G06F 16/30* (2019.01)
*G06F 16/35* (2019.01)
(Continued)

(52) U.S. Cl.
CPC ........ *G06F 16/353* (2019.01); *G06F 16/3335* (2019.01); *G06F 16/3337* (2019.01);
(Continued)

(58) Field of Classification Search
CPC .............. G06F 17/21; G06F 17/30038; G06F 17/30867; G06F 17/30029; G06F 17/30035; G06F 17/30563; G06F 17/30598; G06F 17/30616; G06F 17/30699; G06F 17/30864; G06F 17/22; G06F 17/28; G06F 17/30705; G06F 17/3071; G06F 17/30265; G06F 9/44; H04L 43/04; H04L 43/08; H04L 47/70; H04L 67/10; H04L 67/306; G06Q 30/0256; G06Q 10/04; G06Q 10/063112; G06Q 10/0633; G06Q 10/06393; G06Q 10/06398; G06N 5/02; G06N 5/022; G06N 5/047; G06N 99/005; H04W 12/06; G10L 21/10
USPC ............ 382/225; 434/159; 455/411; 700/92; 704/9, 235; 705/7.11, 7.12, 7.13, 7.14, 705/7.22, 7.26, 7.27, 7.42; 706/46, 18, 706/25, 13, 47, 48, 20, 21; 707/723, 748,
(Continued)

(56) References Cited

U.S. PATENT DOCUMENTS 6,393,490 B1 * 5/2002 Stiles et al. ................... 719/313
7,194,679 B1    3/2007 Green
(Continued)

OTHER PUBLICATIONS

Common Core Standards website (English Language Arts Standards >> Standard 10: Range, Quality, & Complexity >> Measuring Text Complexity: Three Factors page): http://www.corestandards.org/ELA-Literacy/standard-10-range-quality-complexity/measuring-text-complexity-three-factors/.*

*Primary Examiner* — Mark D Featherstone
*Assistant Examiner* — Diedra McQuitery
(74) *Attorney, Agent, or Firm* — Konrad Raynes Davda & Victor LLP; Janaki K. Davda (57) ABSTRACT

Provided are a method, computer program product, and system for improving content. Feedback related to the content is received from a reviewer. The feedback is analyzed with text analytics and classified by on the feedback analysis. A reviewer score is generated and a task is generated for reviewing the feedback wherein the task includes the feedback classification and the reviewer score.

18 Claims, 6 Drawing Sheets

(51) Int. Cl.
  *G06F 16/33* (2019.01)
  *G06Q 10/10* (2012.01)
(52) U.S. Cl.
  CPC .......... *G06F 16/35* (2019.01); *G06F 16/3334* (2019.01); *G06F 16/3344* (2019.01); *G06Q 10/101* (2013.01)
(58) Field of Classification Search
  USPC .......... 707/E17.014, E17.044, E17.108, 602, 707/706, 731, 741, 705, 736, 737, 726, 707/739, 740, 752, 755, 784; 709/203; 726/3
  See application file for complete search history.

(56) References Cited

U.S. PATENT DOCUMENTS

| | | | |
|---|---|---|---|
| 7,620,888 B2 | 11/2009 | Hirst | |
| 7,822,631 B1 * | 10/2010 | Vander Mey et al. | 705/7.29 |
| 7,962,853 B2 | 6/2011 | Bedi | |
| 8,024,211 B1 * | 9/2011 | Cohen | G06Q 10/06 705/7.14 |
| 8,554,601 B1 * | 10/2013 | Marsh | G06Q 30/0278 705/7.32 |
| 2004/0030697 A1 | 2/2004 | Cochran et al. | |
| 2005/0114106 A1 * | 5/2005 | Crawford et al. | 703/6 |
| 2005/0114829 A1 * | 5/2005 | Robin | G06Q 10/06 717/101 |
| 2005/0125422 A1 * | 6/2005 | Hirst | G06F 17/2725 |
| 2006/0026502 A1 | 2/2006 | Dutta | |
| 2007/0061487 A1 * | 3/2007 | Moore | G06F 16/27 709/246 |
| 2007/0271502 A1 | 11/2007 | Bharat et al. | |
| 2008/0040427 A1 * | 2/2008 | Shroff | G06Q 10/10 709/204 |
| 2008/0229421 A1 * | 9/2008 | Hudis et al. | 726/25 |
| 2008/0320568 A1 * | 12/2008 | Hawkins | G06F 21/10 726/5 |
| 2010/0199352 A1 * | 8/2010 | Hill et al. | 726/25 |
| 2011/0167331 A1 | 7/2011 | Altman | |
| 2012/0036423 A1 | 2/2012 | Haynes, II et al. | |
| 2012/0197813 A1 * | 8/2012 | Kurtzig | G06Q 10/10 705/318 |
| 2012/0221485 A1 * | 8/2012 | Leidner et al. | 705/36 R |

* cited by examiner

FEEDBACK ANALYSIS FOR CONTENT IMPROVEMENT TASKS

BACKGROUND OF THE INVENTION

The present invention relates to a method and system for content improvement, and more specifically, to analyzing feedback from content readers to generate and assign content improvement tasks.

Technical documentation is a form of digital content that provides instructions on the installation, configuration, maintenance, and use of software. Technical documentation is often provided over the network on a technical support website with various types of unstructured content (e.g., documentation, videos, images). Historically, technical documentation was provided in bulky manuals that required significant expense for updates. Currently, technical documentation is routinely served from a web server that can be updated easily. As enterprise software becomes more complex, technical support personnel increasingly rely on accurate technical documentation for installation, configuration, maintenance, and use. Large teams of content creators often write technical documentation for enterprise software. Each content creator is a technical expert focused on a particular aspect of the software. The software complexity, combined with the size of the documentation team, increases the likelihood of documentation errors. As customers have a greater reliance on technical documentation, any small error in the documentation may cause significant customer loss of productivity and frustration.

Users discovering errors or problems with the technical documentation generally provide feedback through a support blog. Technical support experts review each blog entry and may provide solutions to users over the blog. Software, with thousands of users, may have hundreds of daily feedback entries to sort through. Determining which feedback needs immediate attention and routing feedback to the proper reviewer is an arduous task.

Over time, the blog entries and solutions are compiled and incorporated into the technical documentation for the next release of the software. Until the next release, errors and deficiencies in the documentation continue to affect users; each user rediscovers problems encountered by other users and must thereafter search through a blog for a solution. There needs to be a way to efficiently process feedback and incorporate the feedback directly into the technical documentation.

SUMMARY

Provided are a method, computer program product, and system for improving content. Feedback related to the content is received from a reviewer. The feedback is analyzed with text analytics and classified by on the feedback analysis. A reviewer score is generated and a task is generated for reviewing the feedback wherein the task includes the feedback classification and the reviewer score.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention. Although the embodiment described in this specification is applied to technical documentation, other embodiments of the present invention may be applied to any form of digital content including images, photos, videos, and audio.

Figure 1A:
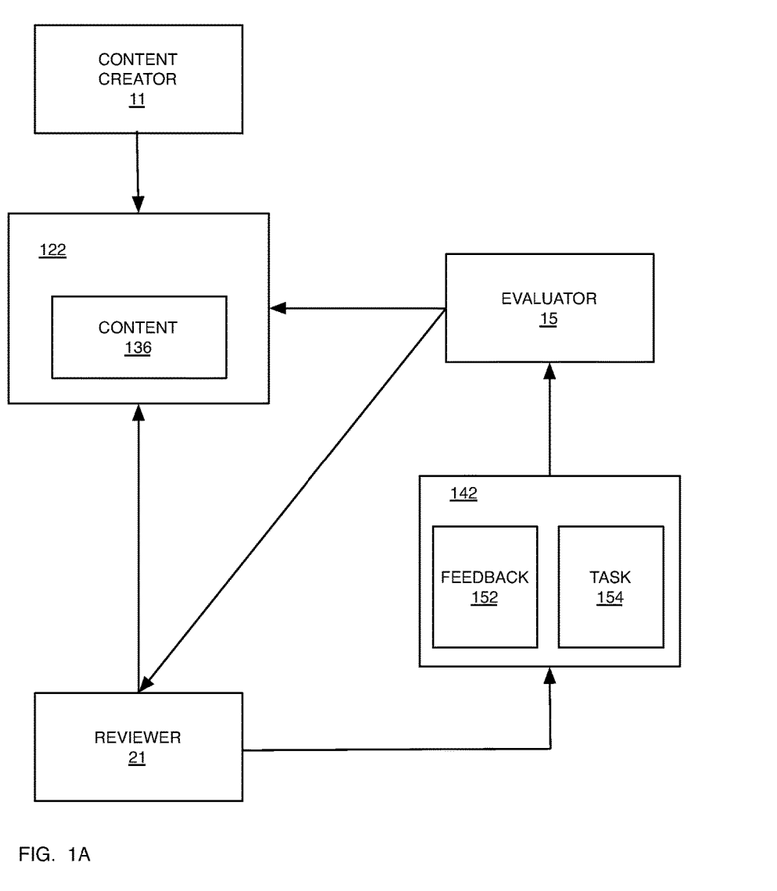
FIG. 1A is a diagram illustrating an overview of the operation in accordance with certain embodiments.

An embodiment of the present invention will now be described in detail with reference to the Figures. FIG. 1A is a diagram illustrating an overview of the operation in accordance with certain embodiments. A content creator 11 publishes content 136 to content server 122. In an embodiment, the content 136 is technical documentation. Reviewer 21 reads content 136 hosted on the server 122. Reviewer 21 desires to provide feedback concerning the content 136 and posts feedback 152 to feedback analysis server 142. A feedback task 154 is generated including a link to feedback 152, reviewer information, and classification of feedback. The feedback task is sent to the evaluator 15. Evaluator 15 evaluates the feedback 152 and may update content 136. The evaluator 15 may be the same individual as content creator 11. In certain embodiments, once evaluator 15 has completed the feedback evaluation the results of the evaluation are sent to reviewer 21.

Figure 1B:
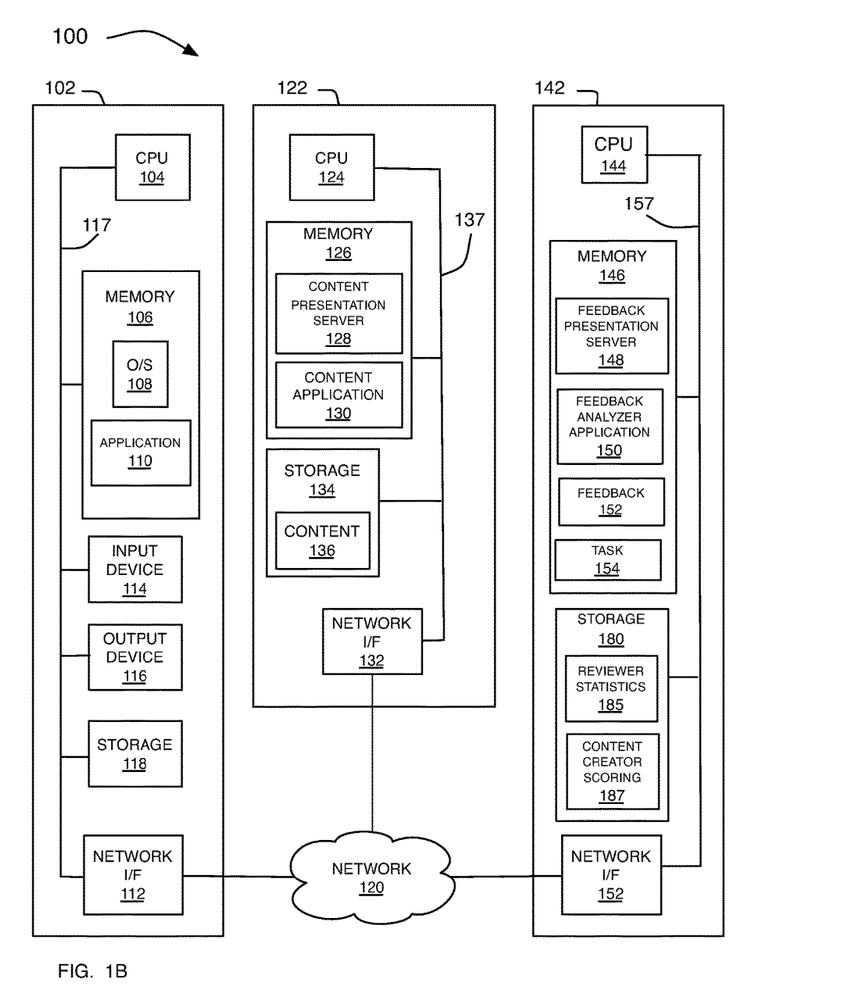
FIG. 1B illustrates, in a block diagram, a computing architecture in accordance with certain embodiments.

FIG. 1B illustrates, in a block diagram, a computing architecture in accordance with certain embodiments for analyzing content feedback and generating tasks to review the feedback. In general, the networked system 100 includes a client (e.g., user's) computer 102, a content server 122, and a feedback analysis server 142. The client computer 102, content server 122, and feedback analysis server 142 are coupled with a network 120. In general, the network 120 may be, for example, a local area network (LAN), a wide area network (WAN) such as the Internet, or a combination of the two, and can include wired, wireless, or fiber optic connections. In a particular embodiment, the network 120 is the Internet.

The client computer 102 includes a Central Processing Unit (CPU) 104 connected via a bus 117 to memory 106, storage 118, an input device 114, an output device 116, and a network interface (UF) device 112. The CPU 104 could be any processor, including a multiprocessor, used to perform an embodiment of the invention. The input device 114 can be any device to give input to the client computer 102. For example, a keyboard, keypad, light pen, touch-screen, trackball, or speech recognition unit, audio/video player, and the like could be used. The output device 116 can be any device to give output to the user, e.g. any conventional display screen or set of speakers along with their respective interface cards, i.e. video cards and sound cards (not shown). Although shown separately from input device 114, the output device 116 and input device 114 could be combined.

For example, a display screen with an integrated touchscreen, a display with an integrated keyboard, or a speech recognition unit combined with a text speech converter could be used.

The network interface device 112 may be any entry/exit device configured to allow network communications between the client computer 102, the content server 122, and the feedback analysis server 142 via the network 120. For example, the network interface device 112 may be a network adapter or other network interface card (NIC).

Storage 118 is preferably a Direct Access Storage Device (DASD). Although it is shown as a single unit, it could be a combination of fixed and/or removable storage devices, such as fixed disc drives, floppy disk drives, tape drives, removable memory cards or optical storage. The memory 106 and storage 118 could be part of one virtual address space spanning multiple primary and secondary storage devices.

The client computer 102 is generally under the control of an operating system (O/S) 108, which is shown in the memory 106. Illustrative operating systems include Linux and Microsoft Windows. More generally, any operating system supporting the application 110 functions disclosed herein may be used.

The memory 106 is preferably a random access memory sufficiently large to hold the necessary programming and data structures of the invention. While the memory 106 is shown as a single entry, it should be understood that the memory 106 may in fact comprise a plurality of modules, and that the memory 106 may exist at multiple levels, from high speed registers and caches to lower speed but larger DRAM chips.

Illustratively, the memory 106 includes an application 110 that, when executed on CPU 104, provides support for locating network addresses at one or more of the servers 122 and 142, and exchanging information between the client computer 102 and the various servers 122 and 142. In one embodiment, the application 110 is a browser that includes a web-based Graphical User Interface (GUI) that allows the user to navigate and display web pages located on the Internet. However, more generally the application may be a thin client application configured to transfer data (e.g., HTML, XML, etc.) between the client computer 102 and the content server 122 and the feedback analysis server 142 via, for example, HTTP. By way of example only, the application 110 will be referred to herein as a browser.

Content server 122 generally comprises a CPU 124, a memory 126, a storage device 134, and a network interface device 132, coupled to one another by a bus 137. The processor 124 could be any processor, including a multiprocessor, used to perform an embodiment of the invention. The memory 126 may be a random access memory sufficiently large to hold the necessary programming and data structures that are located on the content server 122. The programming and data structures may be accessed and executed by the CPU 124 as needed during operation. As shown, the memory 126 includes a content presentation server 128 and a content application 130.

The content presentation server 128 is adapted to service requests from the client computer 102, which invoke the content application 130, in turn the content application 130 may perform various functions which include generating, accessing and/or populating content 136 residing on the content server 122. As used herein, content 136 is machine-readable data (e.g. documents), regardless of the medium of storage or transmission. In one embodiment, content 136 comprises webpages each having an associated network address. In another embodiment, content 136 comprises documentation, images, video, audio, and may include streamed data. Although content 136 are shown in FIGS. 1A and 1B as residing on the content server 122, it should be understood that content 136 need not be static, but instead may be generated by the content application 130.

Feedback analysis server 142 generally comprises a CPU 144, a memory 146, a storage device 180, and a network interface device 152, coupled to one another by a bus 157. The processor 144 could be any processor, including a multiprocessor, used to perform an embodiment of the invention. The memory 146 may be random access memory sufficiently large to hold the necessary programming and data structures that are located on the feedback analysis server 142. The programming and data structures may be accessed and executed by the CPU 144 as needed during operation. As shown, the memory 146 includes a feedback presentation server 148, and a feedback analyzer application 150. The feedback presentation server 148 is adapted to service requests from the client computer 102 which invoke the feedback analysis.

By way of illustration, content presentation server 128 and feedback presentation server 148 may be an instance of Apache, Tomcat or IBM WebSphere products. WebSphere is available from International Business Machines, Inc. Further, the content application 130 may be configured to access a back end database (not shown), or perform other functions. By way of illustration, the content application 130 may be IBM Content Manager. IBM Content Manager is available from International Business Machines.

Storage 180 is preferably a Direct Access Storage Device (DASD). Although it is shown as a single unit, it could be a combination of fixed and/or removable storage devices, such as fixed disc drives, floppy disc drives, tape drives, removable memory cards or optical storage. The memory 146 and storage 180 could be part of one virtual address space spanning multiple primary and secondary storage devices. As shown, the storage 180 includes reviewer statistics 185 and content creator scoring 187. In an embodiment, the reviewer statistics 185 are stored as records in a database, and include reviewer experience and evaluator 15 assessment of the reviewer's 21 feedback 152. In an embodiment, the content creator scoring 187 are stored as records in a database, and include scores based on the complexity of the content written and the content modification required resulting from feedback 152.

A reviewer 21, using application 110 to read content 136 from the content server 122, may want to provide feedback 152 to correct the content 136. The feedback 152 may include text about missing, incomplete, or incorrect information. The reviewer 21 may also want to provide general feedback 152 regarding the organization, clarity, or assessment of the content 136. In an embodiment, the reviewer 21 indicates a desire to provide feedback 152 with a button on the page being reviewed. In certain other embodiments, feedback 152 is provided as audio or video and is transformed to text by the feedback analyzer application 150.

Figure 2:
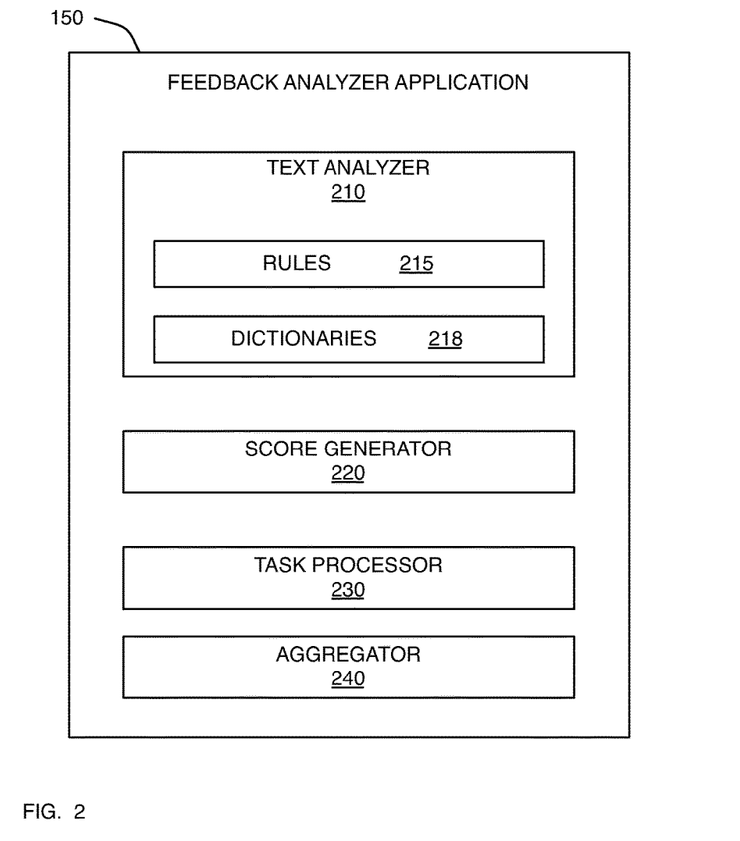
FIG. 2 is a block diagram, illustrating the feedback analyzer, according to one embodiment of the invention.

FIG. 2 is a block diagram, illustrating feedback analyzer application 150, according to one embodiment of the invention. The feedback analyzer application 150 includes a text analyzer 210 including rules 215 and dictionaries 218, a score generator 220, a task processor 230, and an aggregator 240. In an embodiment, feedback 152 that is not in text form is converted to text in the feedback analyzer application 150 before applying the text analyzer 210. The text analyzer applies text analytics to feedback 152. In an embodiment, the text analytics uses rules 215, and software-based dictionaries 218 to classify the feedback 152. In an embodiment, the text analyzer 210 identifies the text language, segments (tokenizes) the text based on the language, and then classifies the segments into categories using domain specific dictionaries 218 and rules 215. In an embodiment, the text analyzer 210 also performs a normalization to expand acronyms and remove ambiguity based on the context of the text. The score generator 220 generates scores for individuals based on configured criteria. Generally, the score represents the quality of the work by the individual. For example, a reviewer's score indicates a prediction of the quality of the reviewer's feedback; similarly a creator's score indicates a prediction that the content from the creator will require corrections. The task processor 230 generates tasks 154 for evaluating feedback 152. The aggregator 240 collects and combines a plurality of feedbacks 152 into a single task 154.

Figure 3:
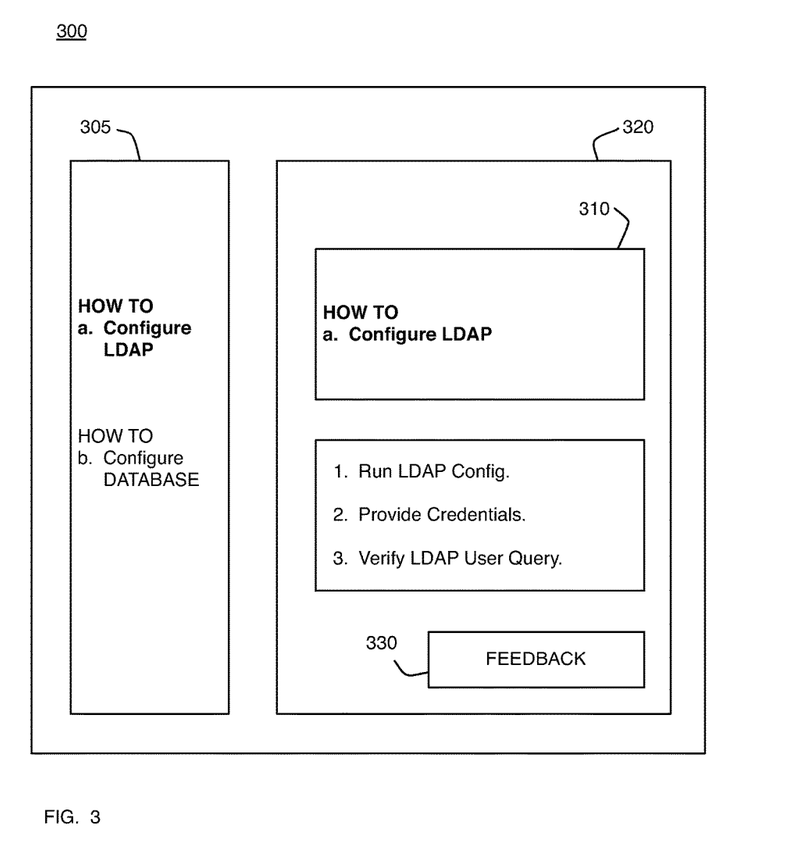
FIG. 3 is an example screen shot of a technical documentation web page according to one embodiment of the invention.

FIG. 3 is an example screen shot 300 of content 136 in the form of a technical documentation web page according to one embodiment of the invention. Screen 300 includes documentation index 305, selection 310, text display area 320, and feedback button 330. In certain embodiments of the invention, the content presentation server 128 generates the technical documentation web page and the documentation index 305 corresponds to the outline of the viewable sections of the technical documentation. In this example, a reviewer 21 on a client computer 102 selects section "a. How to Configure LDAP." The documentation text display area 320 displays the text and graphics associated with the corresponding selected section. In certain embodiments, metadata (not shown) is associated with the section; the metadata includes the content creators responsible for the section content. According to one embodiment, a reviewer 21 may click the feedback button 330 to provide feedback; in response, a feedback web page provided by presentation server 148 is presented to the reviewer 21.

Figure 4:
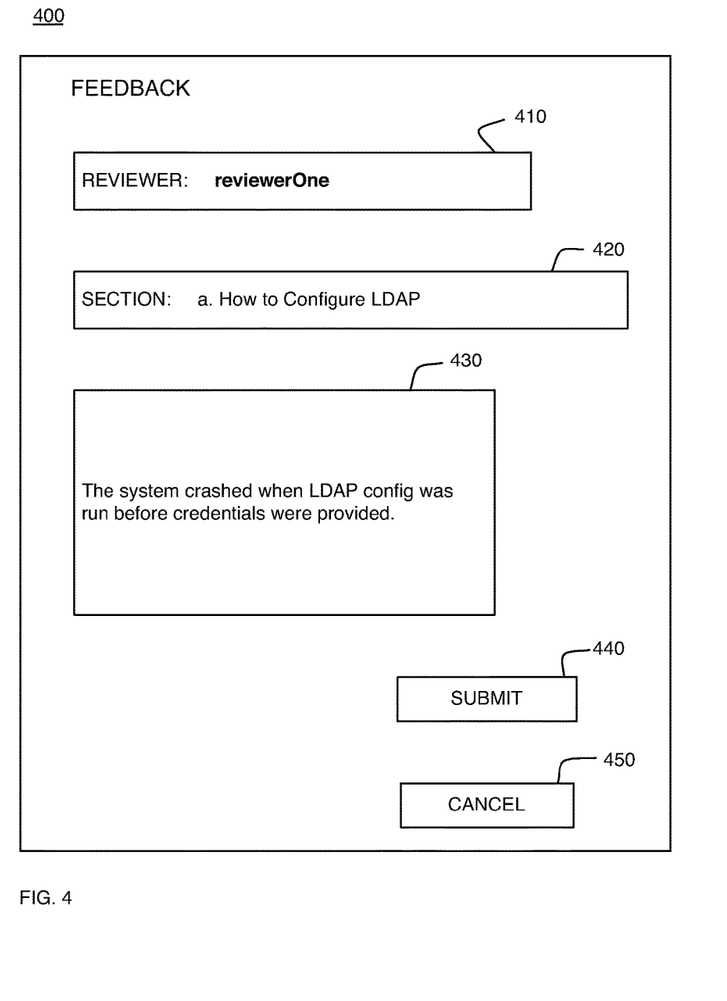
FIG. 4 is an example screen shot of a feedback web page according to one embodiment of the invention.

FIG. 4 is an example screen shot 400 of a feedback web page, according to one embodiment of the invention, generated in response to the reviewer 21 clicking feedback button 330. Screen 400 is generated by feedback presentation server 148 and includes a reviewer identification text display area 410, documentation section identifier display area 420, input area for feedback 430, a submit button 440, and a cancel button 450. The feedback web page 400 is populated with information from content presentation server 128, including, for example, the reviewer identification, the section of documentation, and metadata about the documentation including the content creators 11 responsible for the content. In embodiment, the content creators include at least one content creator 11 responsible for the specific content in the section, and at least one content creator 11 responsible for the general content. In an embodiment the reviewer identification area 410 is not editable and is provided based on reviewer authentication to the system (authentication screen not shown). In this example, the reviewer identification "reviewerOne" is displayed in area 410. The section being reviewed by reviewerOne is displayed in area 420. In this example, reviewerOne filled in area 430 with the feedback "The system crashed when LDAP config was run before credentials were provided." In an embodiment, when the submit button 440 is clicked the feedback information from text area 430 along with information from area 410 and 420 are provided to feedback presentation server 148 and the reviewer 21 is returned to screen shot 300. If the cancel button 450 is clicked, any information provided in block 430 is lost and the reader is returned to screen shot 300.

Figure 5:
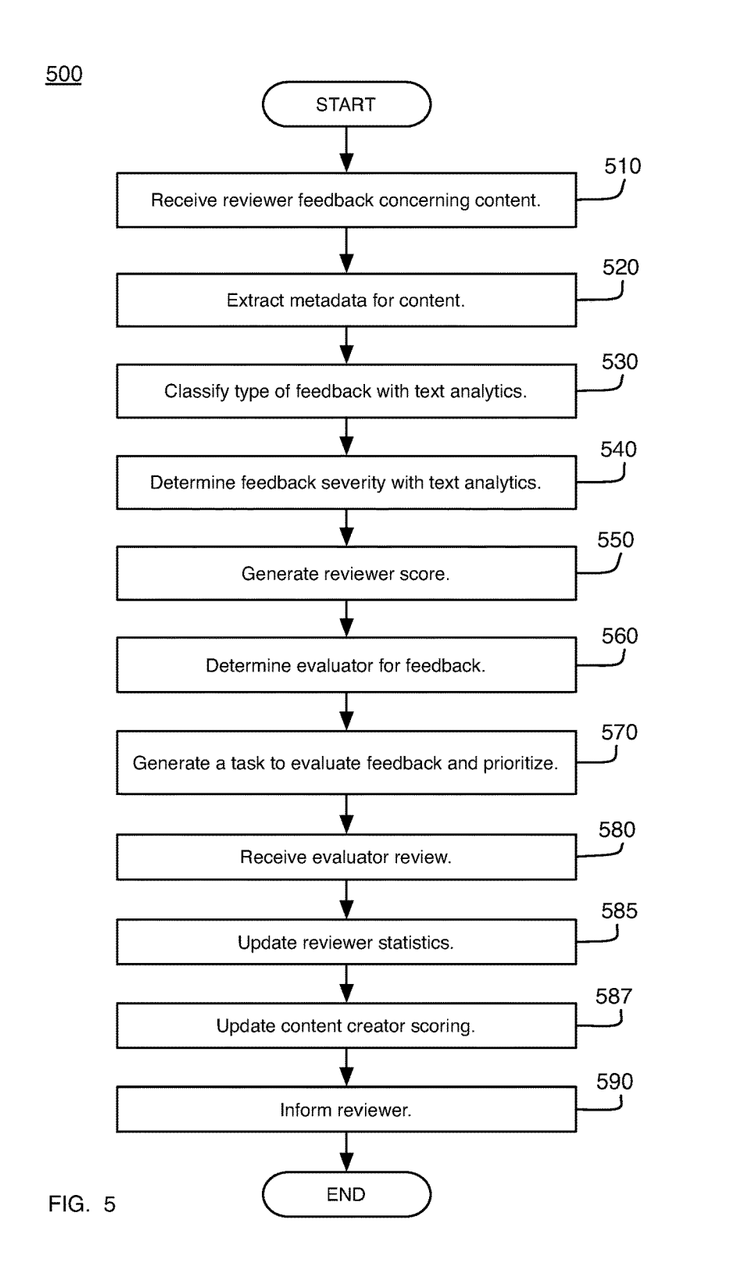
FIG. 5 is a flowchart depicting a process for analyzing document feedback, in accordance with certain embodiments

FIG. 5 is a flowchart depicting a process 500 for analyzing content feedback 152, in accordance with certain embodiments. As shown, process 500 begins at block 510, wherein the feedback analyzer application 150 receives reviewer 21 feedback 152 concerning content 136 from the feedback presentation server 148. At block 520, the feedback analyzer application 150 extracts metadata about the content 136 associated with the feedback 152. In certain embodiments, the content is provided in XML form and the document object model (DOM) is used to gather metadata regarding the relevant section of the document. For example, the metadata may provide the content format, the language, the content creators and responsibilities, and indexing information.

At block 530, the feedback 152 is classified using text analytics. In an embodiment, the text analyzer 210 performs text analytics to classify the type of feedback 152 using particular rules 215 and dictionaries 218 for such classification. For example, feedback 152 directed to missing, incomplete, or incorrect information is classified as "specific," and feedback 152 directed to organization, clarity, or general assessment is classified as "general." In certain other embodiments, technical classification may be used to further classify the feedback 152. For example, using certain other dictionaries 218 and rules 215 feedback 152 may be further classified by the technical feature affected (e.g., installation, configuration, maintenance).

At block 540, the feedback severity is determined using the text analytics. In an embodiment, the text analyzer 210 using rules 215 and dictionaries 218 specific for severity classification is used to determine feedback severity. In an embodiment, feedback that contains both a cause and effect, or contains words such as "crash" or "fatal" are rated high severity; feedback of a general nature, or minor problems such as spelling errors, are rated low severity. Feedback with certain words (e.g., trash, loser) may be rated as SPAM. For example, the feedback in 430 would be considered high severity because it contains a cause "LDAP config was run . . ." and effect "system crashed" as well as the high severity word "crash."

At block 550, the reviewer score is generated. The reviewer score provides a predictor of the quality of the current feedback 152. In an embodiment, the score is generated using score generator 220. In an embodiment, the score generator 220 retrieves reviewer statistics 185 for reviewer 21 and generates a score based on the reviewer statistics 185. In an embodiment, the reviewer statistics 185 includes the past feedback evaluation scores for the reviewer 21; an evaluator 15 reviewing the feedback 152 from a reviewer 21 provides a score for the reviewer's 21 feedback 152. For example if reviewer "reviewerOne" provided previous feedback submissions that were correct and specific, the evaluator would likely score each feedback as high. On the other hand, if the feedback submissions were incorrect or low quality, the evaluator would likely score each feedback as low. In an embodiment, the score generator 220 is configured to generate an overall score for the reviewer 21 based on the reviewer statistics 185. In certain embodiments, the training, certification, or experience of the reviewer 21 on products are contained in the reviewer statistics 185. The training, certification, or experience for the product related to the feedback 152 is combined with other information in the reviewer statistics 185 to generate a reviewer score. In certain embodiments, if the reviewer statistics 185 lacks sufficient prior feedback scores to generate a reviewer score, the experience, certification, or training of the reviewer 21 is used to generate the reviewer score.

In block 560 the evaluator 15 is determined. In an embodiment, the task processor 230 uses metadata about the content creator 11 responsible for the content, and whether the classification is general or specific to determine the evaluator 15. In an embodiment, the metadata associated with the affected content 136 provides the specific and general content creators responsible for evaluating the feedback; a specific content creator 11 would be determined to be the evaluator 15 for feedback classified as "specific," and a general content creator 11 would be determined to be the evaluator for feedback classified as "general." In certain other embodiments, the task processor 230 uses the type classification, subject matter, and list of assigned evaluators 15 to determine the evaluator 15.

In block 570, a task 154 to evaluate the feedback 152 is generated using the task processor 230 and the task priority is set. In an embodiment, the task is prioritized, at least in part on reviewer score. In certain other embodiments, the priority is based on classification, severity, and reviewer score. In an embodiment, the classification and reviewer rating is included in the task 154. In certain embodiments, the task priority is included in the task data structure, and in certain other embodiments, the priority is stored outside of the task data structure. Generally, the task priority is used to indicate the order the evaluator 15 should review the feedback 152 associated with the task 154. In an embodiment, the task 154 is an electronic mail message with all the relevant information automatically sent to the evaluator 15. In another embodiment, the task 154 is a workflow task assigned to the evaluator 15.

In block 580, the feedback analyzer application 150 receives the result of the evaluator review. In an embodiment, the reviewer score by the evaluator 15 is included in the evaluator review. In certain embodiments, the review may include updates to the content 136. In an embodiment, the feedback analyzer application 150 receives a content 136 updated from the evaluator 15 and makes the appropriate update in the content application 130. In another embodiment, the evaluator 15 makes the update directly in the content application 130 and the feedback analyzer application 150 receives a copy of the update and evaluator feedback. In block 585, the reviewer statistics 185 are updated with the information from the evaluator 15.

In bock 587, the content creator scoring 187 is updated. In an embodiment, score generator 220 generates a content creator score based on the complexity of the content (e.g., using a text complexity measure) and number of valid feedbacks received. The content creator score may be used for judging relative cost of creating future content (where cost might include work quality and/or projected defect costs), personnel actions, or task assignments based on content creators ability to manage certain types of content.

In block 590, the reviewer 21 receives a message from the evaluator 15 and processing ends. In an embodiment, if the content 136 was updated a link is provided to the updated content 136.

In certain embodiments, the feedback analyzer 150 is configured to aggregate multiple feedbacks into a single task with the aggregator 240. In an embodiment, the aggregator 240 monitors the sections of content 136 receiving feedback 152 at a configured frequency (e.g., daily). Rather than generating a task 154 for each feedback, tasks are generated for each section of the content 136 receiving feedback 152; the task 154 includes the aggregate of the feedback information since the last task 154 generated for that section of the content 136. In an embodiment, the priority of the task 154 is determined based on the highest individual priority within the aggregate.

Additionally, a translator (not shown) may be provided in either the feedback presentation server 148 or the feedback analyzer 150 to translate the feedback 152 into the language of the evaluator 15. Content metadata would direct the translator to convert text from the language of the reviewer 21 to the language of the evaluator 15.

In certain embodiments (not shown) the evaluator 15 may be scored based on the number of tasks evaluated, time to evaluate the task 154 versus the task priority.

Embodiments provide a system for automatically generating prioritized tasks 154 to update content 136. The embodiments are particularly helpful for content 136, in the form of technical documentation, receiving a substantial amount of feedback 152. Automatically generating tasks 154 based on automatic classification provides a more reliable and repeatable content improvement process. Reviewer classification of feedback is subjective and unpredictable, and an automatic system is objective and predictable. Automatically generating prioritized tasks 154 enables the evaluators 15 to focus on the most important concerns. Thus, unlike conventional systems that require manual review of blogs, the embodiments will automatically identify the severity of problems, not only based upon the words used by the reviewers 21, but using the experience and past statistics of the reviewers 21. Treating all reviewers 21 equally may provide too much emphasis on problems from novice users. Thus, the embodiments are particularly useful for reviews of technical documentation. Further, rather than asking the reviewer 21 to determine the criticality of the feedback 152 the feedback analysis application 150 can determine the criticality in a repeatable manner. Although application of text analytics may provide the necessary classification, the past experience and accuracy of the reviewer's previous comments may be helpful in determining the classification and criticality of the feedback. Once the feedback is analyzed in light of the reviewer's experience and past accuracy, the particular content creator 11 is identified to evaluate and make any necessary changes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving content, comprising:

receiving feedback related to the content from a reviewer, wherein the content comprises a technical documentation web page on an Internet, by at least one computing processor;

performing text analytics using rules and dictionaries to determine a feedback classification of one of specific and general and to determine a feedback severity of one of high severity and low severity, wherein feedback on at least one of missing, incomplete, and incorrect information is classified as specific, wherein feedback on at least one of organization, clarity, and general assessment is classified as general, wherein feedback of a major problem is determined to have a high severity, and wherein feedback of a minor problem is determined to have a low severity, by the at least one computing processor;

generating a reviewer score based on reviewer statistics that reflect past feedback evaluation scores for the reviewer and that reflect current correctness of the feedback based on training, certification, and experience of the reviewer for a product related to the feedback, by the at least one computing processor;

selecting an evaluator for evaluating the feedback based on whether the feedback classification is one of specific and general and based on content creators associated with the content, by the at least one computing processor;

invoking a feedback translator to translate the feedback from a first language of the reviewer into a second language of the evaluator based on content metadata, by the at least one computing processor;

generating a task for reviewing the feedback wherein the task includes the feedback classification and the reviewer score, by the at least one computing processor;

setting a priority for the task based upon 1) the reviewer score, 2) the feedback classification of one of specific and general, and 3) the feedback severity of one of high severity and low severity, wherein the priority is used to indicate an order in which the feedback is to be evaluated by the evaluator, by the at least one computing processor;

receiving an evaluation by the evaluator that includes a new reviewer score for the feedback received from the reviewer and updates to the content, by the at least one computing processor;

updating the content; and displaying the updated content comprising the technical documentation web page using a web-based Graphical User Interface (GUI).

2. The method of claim 1, wherein the task is an electronic mail message.

3. The method of claim 1, further comprising:
assigning the task to the evaluator.

4. The method of claim 3, further comprising:
updating the reviewer statistics based at least in part on the evaluation.

5. The method of claim 3, further comprising:
generating a creator score for a creator of the content based at least in part on a text complexity measure and the evaluation.

6. The method of claim 4, wherein the new reviewer score is based at least in part on the updated reviewer statistics.

7. A system for improving content, comprising:
a processor; and
a storage device connected to the processor, wherein the storage device has stored thereon a program, wherein the processor is configured to execute instructions of the program to perform operations, and wherein the operations comprise:
receiving feedback related to the content from a reviewer, wherein the content comprises a technical documentation web page on an Internet;
performing text analytics using rules and dictionaries to determine a feedback classification of one of specific and general and to determine a feedback severity of one of high severity and low severity, wherein feedback on at least one of missing, incomplete, and incorrect information is classified as specific, wherein feedback on at least one of organization, clarity, and general assessment is classified as general, wherein feedback of a major problem is determined to have a high severity, and wherein feedback of a minor problem is determined to have a low severity;
generating a reviewer score based on reviewer statistics that reflect past feedback evaluation scores for the reviewer and that reflect current correctness of the feedback based on training, certification, and experience of the reviewer for a product related to the feedback;
selecting an evaluator for evaluating the feedback based on whether the feedback classification is one of specific and general and based on content creators associated with the content;
invoking a feedback translator to translate the feedback from a first language of the reviewer into a second language of the evaluator based on content metadata;
generating a task for reviewing the feedback wherein the task includes the feedback classification and the reviewer score;
setting a priority for the task based upon 1) the reviewer score, 2) the feedback classification of one of specific and general, and 3) the feedback severity of one of high severity and low severity, wherein the priority is used to indicate an order in which the feedback is to be evaluated by the evaluator;

receiving an evaluation by the evaluator that includes a new reviewer score for the feedback received from the reviewer and updates to the content;

updating the content; and displaying the updated content comprising the technical documentation web page using a web-based Graphical User Interface (GUI).

8. The system of claim 7, wherein the task is an electronic mail message.

9. The system of claim 7, wherein the operations further comprise:
assigning the task to the evaluator.

10. The system of claim 9, wherein the operations further comprise:
updating the reviewer statistics based at least in part on the evaluation.

11. The system of claim 9, wherein the operations further comprise:
generating a creator score for a creator of the content based at least in part on a text complexity measure and the evaluation.

12. The system of claim 10, wherein the new reviewer score is based at least in part on the updated reviewer statistics.

13. A computer program product for improving content, the computer program product comprising:
a non-transitory computer readable medium having computer readable program code embodied therewith, the computer readable program code, executable by at least one processor of a computer is configured to perform:
receiving feedback related to the content from a reviewer, wherein the content comprises a technical documentation web page on an Internet;
performing text analytics using rules and dictionaries to determine a feedback classification of one of specific and general and to determine a feedback severity of one of high severity and low severity, wherein feedback on at least one of missing, incomplete, and incorrect information is classified as specific, wherein feedback on at least one of organization, clarity, and general assessment is classified as general, wherein feedback of a major problem is determined to have a high severity, and wherein feedback of a minor problem is determined to have a low severity;
generating a reviewer score based on reviewer statistics that reflect past feedback evaluation scores for the reviewer and that reflect current correctness of the feedback based on training, certification, and experience of the reviewer for a product related to the feedback;
selecting an evaluator for evaluating the feedback based on whether the feedback classification is one of specific and general and based on content creators associated with the content;
invoking a feedback translator to translate the feedback from a first language of the reviewer into a second language of the evaluator based on content metadata;
generating a task for reviewing the feedback wherein the task includes the feedback classification and the reviewer score;
setting a priority for the task based upon 1) the reviewer score, 2) the feedback classification of one of specific and general, and 3) the feedback severity of one of high severity and low severity, wherein the priority is used to indicate an order in which the feedback is to be evaluated by the evaluator;

receiving an evaluation by the evaluator that includes a new reviewer score for the feedback received from the reviewer and updates to the content;

updating the content; and displaying the updated content comprising the technical documentation web page using a web-based Graphical User Interface (GUI).

14. The computer program product of claim 13, wherein the task is an electronic mail message.

15. The computer program product of claim 13, wherein the computer readable program code, executable by the at least one processor of the computer, is configured to perform:

assigning the task to the evaluator.

16. The computer program product of claim 15, wherein the computer readable program code, executable by the at least one processor of the computer, is configured to perform:

updating the reviewer statistics based at least in part on the evaluation.

17. The computer program product of claim 15, wherein the computer readable program code, executable by the at least one processor of the computer, is configured to perform:

generating a creator score for a creator of the content based at least in part on a text complexity measure the and the evaluation.

18. The computer program product of claim 16, wherein the new reviewer score is based at least in part on the updated reviewer statistics.

* * * * *